United States Patent
Kikuchi et al.

(10) Patent No.: US 6,937,540 B1
(45) Date of Patent: Aug. 30, 2005

(54) INFORMATION RECORDING DEVICE WHICH HANDLES A PLURALITY OF RECORDING SURFACES AND INFORMATION RECORDING METHOD WHICH HANDLES A PLURALITY OF RECORDING SURFACES

(75) Inventors: Shinichi Kikuchi, Yokohama (JP); Kazuya Fujita, Kawasaki (JP); Hideo Kataoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 828 days.

(21) Appl. No.: 09/986,142

(22) Filed: Nov. 7, 2001

(30) Foreign Application Priority Data

Nov. 8, 2000 (JP) .............................. 2000-340956

(51) Int. Cl.⁷ ............................................. G11B 21/08
(52) U.S. Cl. ..................................... 369/30.03; 369/84
(58) Field of Search ........................ 369/30.01, 30.03, 369/30.04, 30.05, 30.06, 30.19, 30.2, 47.12, 369/47.13, 53.2, 53.24, 53.41, 83, 84, 124.08

(56) References Cited

U.S. PATENT DOCUMENTS 4,823,333 A * 4/1989 Satoh et al. ................... 369/84

6,529,452 B2 * 3/2003 Ohta et al. ................ 369/30.05

FOREIGN PATENT DOCUMENTS

| JP | 8-45195 | 2/1996 |
|---|---|---|
| JP | 8-167275 | 6/1996 |
| JP | 8-315549 | 11/1996 |
| JP | 10-134507 | 5/1998 |
| JP | 10-172237 | 6/1998 |
| JP | 11-176096 | 7/1999 |
| JP | 11-317016 | 11/1999 |
| JP | 11-339447 | 12/1999 |
| JP | 2000-260163 | 9/2000 |
| JP | 2000-308104 | 11/2000 |

* cited by examiner

Primary Examiner—Paul W. Huber
(74) Attorney, Agent, or Firm—Pillsbury Winthrop Shaw Pittman, LLP

(57) ABSTRACT

An information recording device which handles a plurality of recording surfaces has a recording device which, when the remaining recording capacity of a first recording surface is less than a predetermined capacity, continues to record the target information onto a first recording surface, and records the same target information onto a hard disk as well. When a second recording surface is provided, the recording device stops recording onto the hard disk, and records following target information onto the second recording surface, and records the target information, which was partially recorded on the hard disk, so as to be duplicated with a part of the target information recorded on the first recording surface.

12 Claims, 13 Drawing Sheets

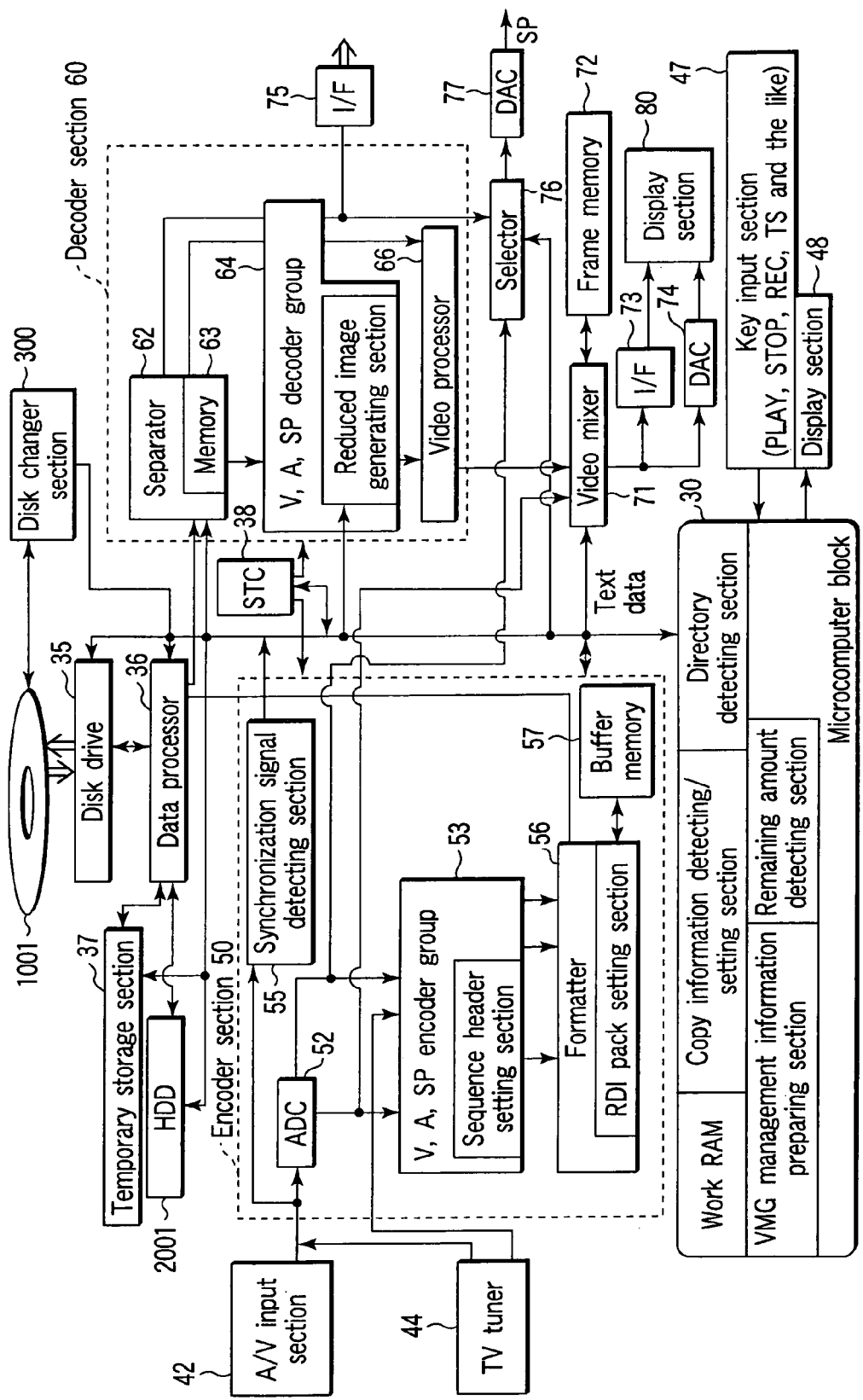
F I G. 1

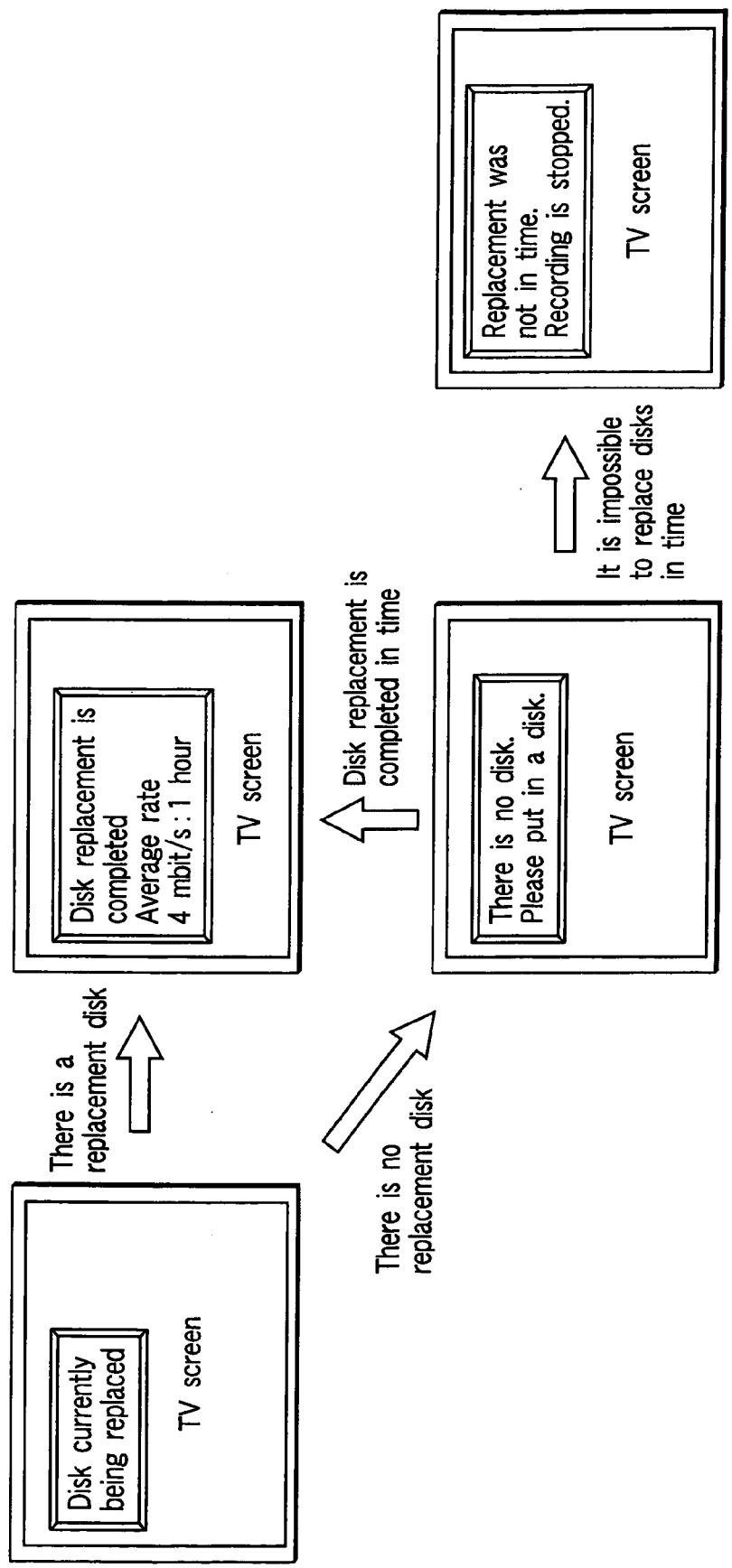
F I G. 13

INFORMATION RECORDING DEVICE WHICH HANDLES A PLURALITY OF RECORDING SURFACES AND INFORMATION RECORDING METHOD WHICH HANDLES A PLURALITY OF RECORDING SURFACES

CROSS-REFERENCE TO RELATED APPLICATIONS

This application is based upon and claims the benefit of priority from the prior Japanese Patent Application No. 2000-340956, filed Nov. 8, 2000, the entire contents of which are incorporated herein by reference.

BACKGROUND OF THE INVENTION

1. Field of the Invention

The present invention relates to an information recording device which can record information onto a hard disk or the like, and which can play back the information recorded on the hard disk or the like, and which can record information onto recording media such as a DVD (digital versatile disk) or the like, and which can play back the information recorded on the DVD. In particular, the present invention relates to an information recording device which handles a plurality of recording surfaces and an information recording method which handles a plurality of recording surfaces, which eliminate omissions of recording information during the operation of replacing a front surface (first recording surface) and a reverse surface (second recording surface) of a DVD which is recordable on both surfaces.

2. Description of the Related Art

In recent years, optical disk playback devices which handle dynamic images, for playing back optical disks on which dynamic images and audio are recorded, have been developed. These devices, such as, for example, LD, video CD playback devices or the like, have become popular for viewing movie software, enjoying karaoke or the like.

Currently, a DVD standard has been proposed which utilizes the MPEG2 (Moving Image Coding Expert Group) method that has been standardized internationally, and which utilizes the AC3 audio compression method. This standard supports a dynamic image compression method with the MPEG2 method in accordance with an MPEG2 system layer, and supports an audio compression method with the AC3 audio compression method and an MPEG audio compression method. Moreover, supplementary image data in which bitmap data is run-length-compressed can be treated as the subtitles of a movie, karaoke or the like. Further, control data for special playback (a navigation pack) such as fast forward, reverse or the like is added to the standard. Moreover, in the standard, ISO9660 and micro UDF standards are supported such that the data of a disk can be read by a computer.

Further, as a standard of a medium itself, following the standards of DVD-ROMs which are media of DVD-videos, standards of DVD-RAMs (recording capacity: about 4.7 GB) have been completed, and DVD-RAM drives have begun to become popular as peripheral devices of computers.

Further, currently, a standard of RTR (Real Time Recording)-DVDs which utilizes DVD-RAMs is being completed, and the verification operation has been finished. The standard of RTR-DVDs has been conceived of on the basis of the standard of DVD-videos which are currently on the market. Further, a file system corresponding to RTR-DVDs has also been standardized.

Further, a device which can record and play back broadcasting signals by using a built-in hard disk drive (HDD) has appeared. The hard disk drive can record data of, for example, 100 gigabytes or more.

A mass storage hard disk, which cannot be pulled out to the exterior, is built-in in a hard disk device. However, a mass storage cannot be infinitely stored with data. Further, because the hard disk itself cannot be pulled out to the exterior, data recorded on the hard disk cannot be played back by other devices. On the other hand, with a DVD handled by a DVD device, there is the tendency for the recording capacity thereof to be less than that of a hard disk, but a DVD can be removed from a DVD device and is always portable.

An object of the present invention is to provide an information recording device which handles a plurality of recording surfaces and an information recording method which handles a plurality of recording surfaces which can prevent omissions of recording information during the operation of replacing a front surface and a reverse surface of a both surfaces recordable DVD, by making the best use of the advantages of both of a hard disk and a DVD.

BRIEF SUMMARY OF THE INVENTION

To solve the above-described problems and achieve the objects, an information recording device which handles a plurality of recording surfaces and an information recording method which handles a plurality of recording surfaces are structured as follows.

(1) An information recording device which handles a plurality of recording surfaces of the present invention comprises: first recording-playback means for carrying out recording of information onto a predetermined recording surface of a first information recording medium which is loadable and removable, and for carrying out playback of information recorded on the predetermined recording surface of the first information recording medium; a second information recording medium which is built-in; second recording-playback means for carrying out recording of information onto the second information recording medium, and for carrying out playback of information recorded on the second information recording medium; first recording control means for making target information be recorded onto the first recording surface of the first information recording medium by the first recording-playback means, in correspondence with an instruction to record information onto the first information recording medium; second recording control means for, when, accompanying recording control of the first recording control means, a remaining recording capacity of the first recording surface is less than a predetermined capacity, making the target information continue to be recorded on the first recording surface of the first recording medium, and making the same target information be recorded onto the second information recording medium as well; requesting means for requesting a second recording surface of the first information recording medium when, accompanying the recording control of the first recording control means, the remaining recording capacity of the first recording surface is less than the predetermined capacity; and third recording control means for, when the second recording surface of the first information recording medium is provided in correspondence with a request of the requesting means, stopping recording control by the second recording control means, and making following target information be recorded onto the second recording surface of the first information recording medium, and making the target information partially recorded on the second information recording medium be duplicately recorded with a part of the target information recorded on the first recording surface.

(2) An information recording method which handles a plurality of recording surfaces of the present invention comprises: recording target information onto a first recording surface of a first information recording medium in correspondence with an instruction to record information onto the first information recording medium which is loadable and removable; making the target information continue to be recorded onto the first recording surface of the first information recording medium, and making the same target information be recorded onto a built-in second information recording medium when, accompanying recording of the target information onto the first recording surface of the first information recording medium, a remaining recording capacity of the first recording surface is less than a predetermined capacity; requesting a second recording surface of the first information recording medium when, accompanying the recording of the target information onto the first recording surface of the first information recording medium, the remaining recording capacity of the first recording surface is less than the predetermined capacity; and stopping recording onto the second information recording medium when the second recording surface of the first information recording medium is provided in correspondence with that request, and making following target information be recorded onto the second recording surface of the first information recording medium, and partially duplicately recording the target information, partially recorded on the second information recording medium, with the target information recorded on the first recording surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a schematic structure of a recording/playback device according to an embodiment of the present invention.

FIG. 13 is a figure showing examples of various messages which are displayed on a screen at the time of disk replacement.

DETAILED DESCRIPTION OF THE INVENTION

Hereinafter, embodiments of the present invention will be described with reference to the drawings.

FIG. 1 is a diagram showing an example of a recording/playback device (an information recording device which handles a plurality of recording surfaces) to which the present invention is applied. Broadly classifying the respective blocks in FIG. 1, the main block of a recording section is shown at the left side, and the main block of a playback section is shown at the right side. The blocks of respective sections of FIG. 1 will be described in detail later.

Figure 2:
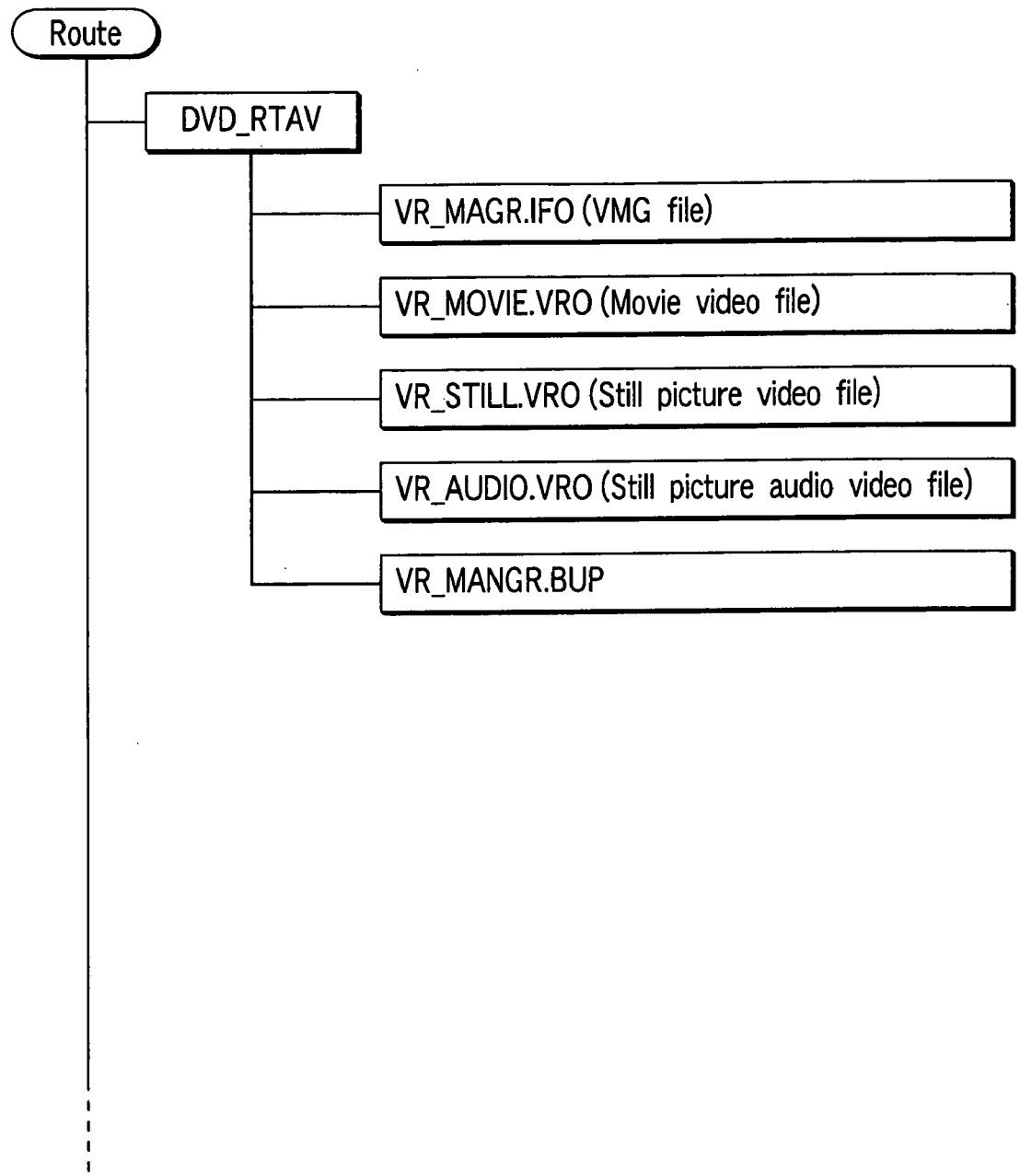
FIG. 2 is a figure showing a portion of a directory structure of a DVD system.

FIG. 2 shows a portion of a directory structure of a DVD system. FIG. 2 shows the directory (which is shown as DVD_RTAV herein) structure of, in particular, a real time recording DVD (RTR-DVD) of a DVD system.

Respective files of VR_MANGR.IFO serving as a video manager file, VR_MOVIE.VRO serving as a movie video file, VR_STILL.VRO serving as a still picture video file, VR_AUDIO.VRO serving as an audio video file, and VR_MANGR.BUP serving as a backup of the video manager, exist in the directory (DVD-RTAV).

Navigation data is recorded in the VR_MANGR.IFO file. This navigation data is data for advancing a program set, a program, an entry point, a play list, or the like.

The VR_MOVIE.VRO file is a so-called movie AV file for recording a movie video object (movie VOB). This VR_MOVIE.VRO is used for recording an original VOB composed of video parts including arbitrary sub-picture units. Further, at this time, audio parts relating to the video parts are also included in the original VOB.

The VR_STILL.VRO is a still picture AV file for recording a still picture VOB.

Further, the VR_AUDIO.VRO is a still picture additional audio file for recording an additional audio stream for a still picture. The still picture additional audio file shows audio streams recorded by after recording. The still picture additional audio file is used in combination with several video parts recorded in the VR_STILL.VRO.

The VR_MANGR.BUP is a backup file of the VR_MANGR.IFO.

Figure 3:
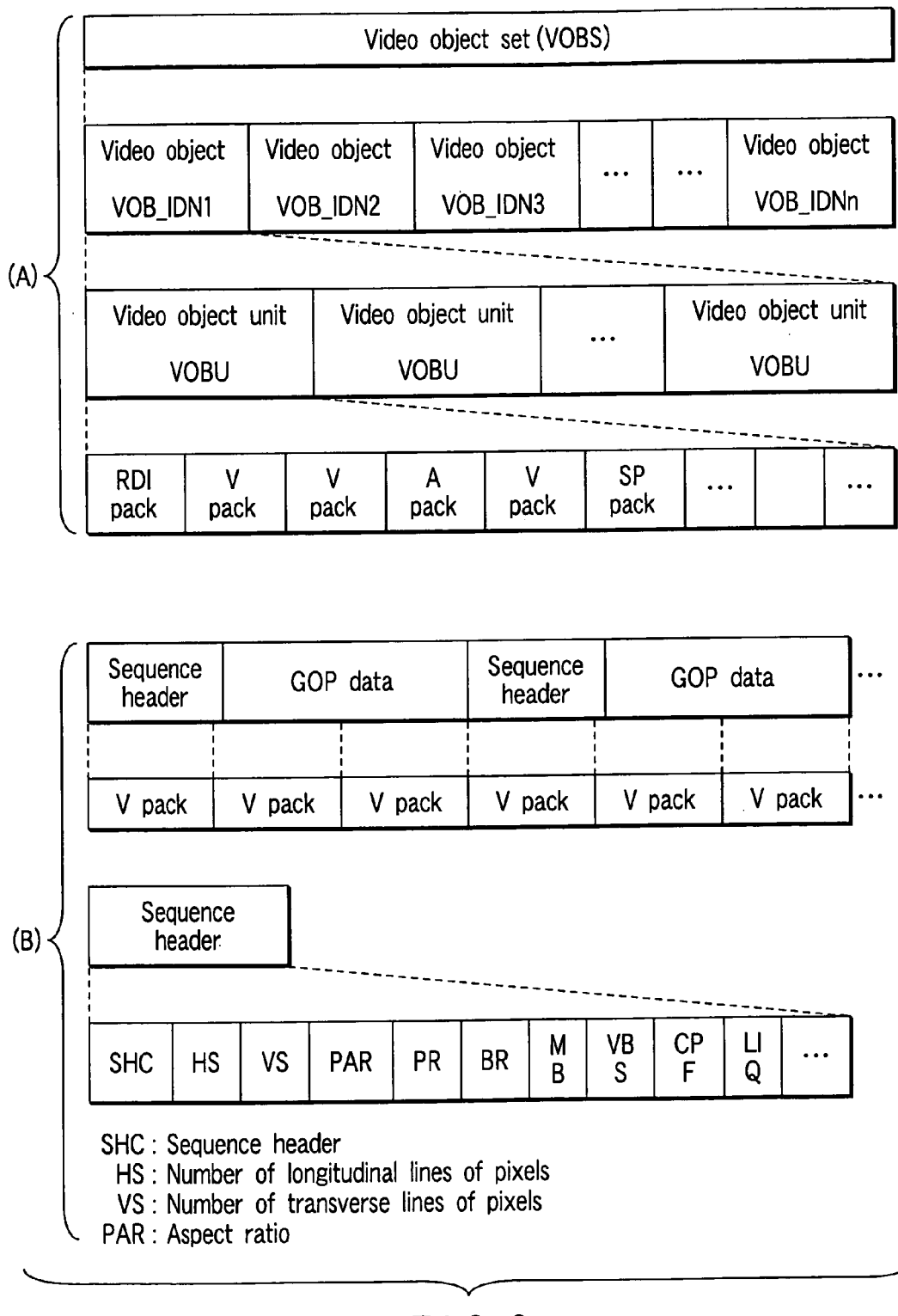
FIG. 3 is a figure showing an example of a format of video data.

FIG. 3 of (A) shows a file structure of the above-described VR_MANGR.VRO.

Video files have a hierarchical structure. A single video file is composed of a plurality of VOBs (video objects). A single VOB is composed of a plurality of VOBUs (video object units). A single VOBU is composed of a plurality of packs. An RDI pack, a V pack, an A pack, and the like exist as the packs.

The V pack is a pack in which video data is compressed by the MPEG2 method, and is composed of a pack header, a packet header, and a video data section. The A pack is a pack in which audio data is processed by a method such as, for example, linear PCM, MPEG, AC3 or the like. The A pack is composed of a pack header, a packet header, and an audio data section.

FIG. 3 of (B) shows a format of video data based on the MPEG2 method.

A group of pictures (GOP) is a compression unit of a plurality of video frames. A sequence header is added to the head of the group of pictures. A starting code (SHC) of the sequence header, a number (HS) of longitudinal lines of pixels, a number (VS) of lateral lines of pixels, an aspect ratio (PAR), and the like are described in the sequence header.

Figure 4:
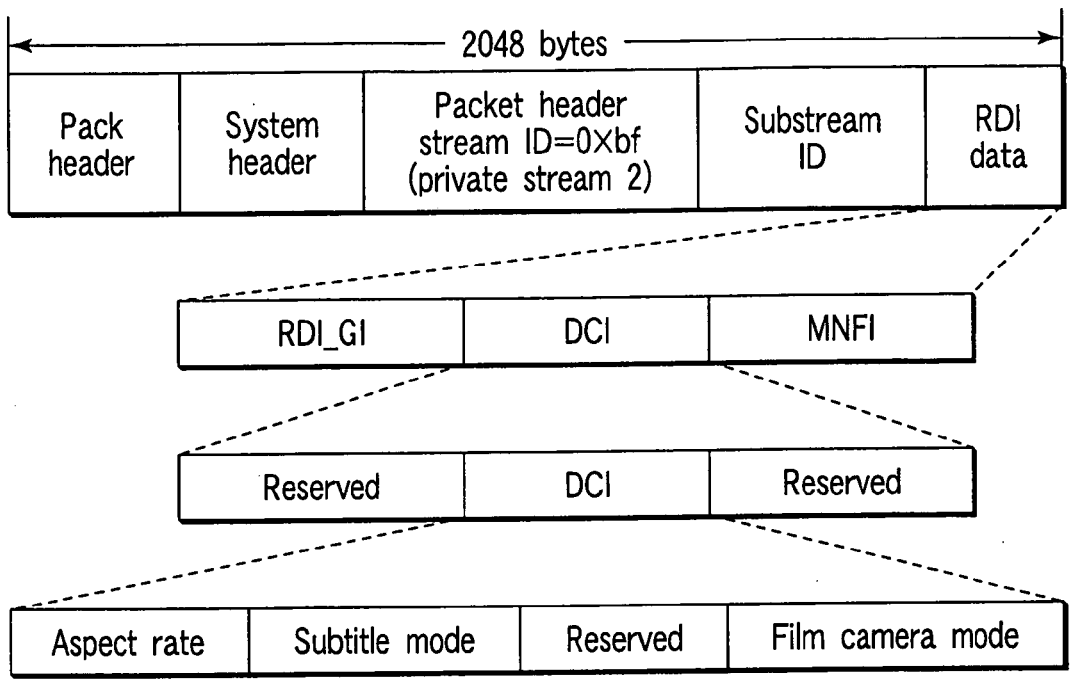
FIG. 4 is a figure showing details of RID data.

The RDI pack shown in FIG. 4 is called a real time data information pack (RDI_PCK). The real time data information pack includes real time general information (RDI_GI), display control and copy control information (DCI_CCI), manufacturer information (MNFI), and the like.

The real time general information (RDI_GI) includes information showing the start time at which the first field of the VOBU to which this information belongs is played back, namely, VOBU_S_PTM, and information showing the recording time of this VOBU, namely, VOBU_REC_TM.

The display control and copy control information (DCI_CCI) includes (DCI_CCI_SS) which shows the status of the display control information (DCI) and the copy control information (CCI), and the display control information (DCI) itself, and the copy control information (CCI) itself.

Among the (DCI_CCI_SS), a display control information status (DCI_SS) identifies a case in which only effective aspect ratio information exists (01b), and a case in which an effective aspect ratio, a subtitle mode, and a film camera mode exist (11b).

The display control information (DCI) includes aspect ratio information, subtitle mode information, and the film camera mode.

The aspect ratio information shows that the aspect ratio is 4:3 (0000b), or that the aspect ratio is 16:9 (0001b). When a source picture is a letter box, the aspect ratio information identifies that the letter box (14:9) is a screen center arrangement (1000b), the letter box (14:9) is a screen top arrangement (0100b), the letter box (16:9) is a screen center arrangement (1101b), the letter box (16:9) is a screen top arrangement (0010b), the letter box (>16:9) is a screen center arrangement (1010b), and the letter box (14:9) is a full format and center arrangement.

The subtitle mode identifies that the subtitle does not open (00b), the subtitle is in an active image area (01b), and the subtitle is out of an active image area (10b).

The film camera mode identifies a camera mode (0b), and a film mode (1b).

Figure 5:
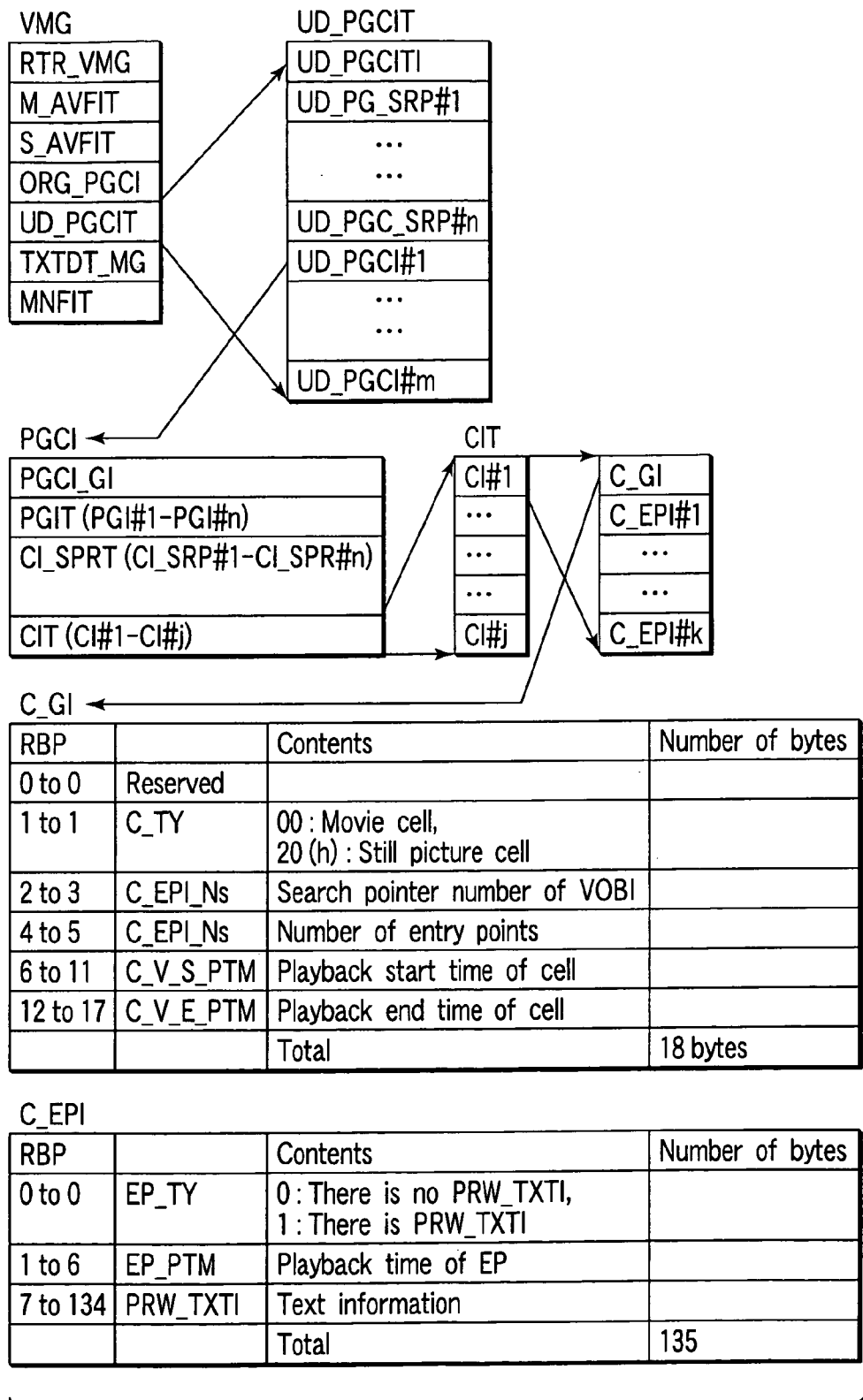
FIG. 5 is a figure showing a hierarchical structure of a video manager (VMG).

FIG. 5 is a figure showing the hierarchical structure of the video manager (VMG) and showing a management system of a data playback procedure.

The data playback procedure recorded in the video file is defined by a program chain (PGC) such as shown in FIG. 5. In this program chain (PGC), a cell (Cell) is defined. In the cell (Cell), the VOB to be played back is defined. The portion of the PGC on which concrete information is recorded is program chain information (PGCI) among the VMG files. There are two types of PGCIs: one is an original PGCI (ORG_PGCI), and the other one is a user defined PGC table (UD_PGCIT).

Here, returning to FIG. 1, the recording/playback device which handles the standardized disks described above will be described.

The playback processing at the recording/playback device shown in FIG. 1 is carried out in accordance with the program chain information (PGCI) showing the playback procedure of the program. The PGCI can designate a plurality of programs (PG). Cell information (CI) is defined in the PGCI. A cell entry point (C_EPI) is designated by the CI, and the VOB to be played back is specified. Further, a special PGC for playing back in the recorded order is called an original PGC, and the information of the original PGC is recorded as ORG_PGCI. Moreover, the attribute information of the video data at this time (resolution information, aspect information, audio attribute information, and the like) are recorded in stream information (STI) in the VMGI. Further, the above-described pack is a minimum unit which carries out the data transfer processing. The minimum unit of logical processing is a cell unit. Namely, the logical processing is carried out in cell units. Accordingly, when recording is carried out, recording signals are converted to a format which matches the above-described format.

The recording/playback device has, as the main structure thereof, a hard disk drive device 2001, and a disk drive 35, an encoder section 50, a decoder section 60, and a microcomputer block 30. The disk drive 35 rotationally drives an optical disk 1001 as an information storage medium which can form video files, and carries out reading and writing of information from and onto the optical disk 1001. The encoder section 50 forms the recording side. The decoder section 60 forms the playback side. The microcomputer block 30 controls the operation of the body of the device.

The encoder section 50 is provided with an ADC (analog digital converter) 52, an encoder group 53, a formatter 56, and a buffer memory 57. The encoder group 53 includes a V (video) encoder, an A (audio) encoder, and an SP (subimage) encoder. The formatter 56 makes outputs of the respective encoders be in predetermined formats.

An external analog video signal+an external analog audio signal from an AV input section 42, or an analog video signal+an analog audio signal from a TV (television) tuner 44 are inputted to the ADC 52.

The ADC 52 digitizes the inputted analog video signal by, for example, a sampling frequency of 13.5 MHz and a number of quantization bits of 8 bits. Namely, a brightness component Y, a color difference component Cr (or Y-R), and a color difference component Cb (or Y-B) are respectively quantized by 8 bits.

In the same way, the ADC 52 digitizes the inputted analog audio signal by, for example, a sampling frequency of 48 kHz and a number of quantization bits of 16 bits.

Note that, when a digital video signal and a digital audio signal are inputted to the ADC 52, the ADC 52 throughpasses the digital video signal and the digital audio signal. Further, the ADC 52 may carry out a jitter reducing processing and a sampling rate changing processing on the digital video signal and the digital audio signal without altering the contents thereof. However, when the sampling frequencies or the like of the digital video signal and the digital audio signal are different, the ADC 52 carries out a conversion processing on the digital video signal and digital audio signal.

The digital video signal outputted from the ADC 52 is transmitted to the formatter 56 via the V encoder. Further, the digital audio signal outputted from the ADC 52 is transmitted to the formatter 56 via the A encoder.

On the basis of the MPEG2 or MPEG1 standard, the V encoder converts the inputted digital video signal to a digital signal compressed by a variable bit rate. Further, on the basis of the MPEG or AC-3 standard, the A encoder converts the inputted digital audio signal to a digital signal compressed by a fixed bit rate or a digital signal of a linear PCM.

Here, a case in which a supplementary image signal is inputted from the AV input section 42 is conceived. For example, a case in which a signal from a DVD video player having an independent output terminal of the supplementary image signal is inputted from the AV input section 42 is conceived. Or, a case in which a DVD video signal having such a data structure is broadcast, and is received at the TV tuner 44 is conceived. The supplementary image signal (supplementary image pack) in the DVD video signal is inputted to the SP encoder. The supplementary image signal inputted to the SP encoder is arranged to a predetermined signal format, and transmitted to the formatter 56.

While the formatter 56 is using the buffer memory 57 as a work area, the formatter 56 carries out predetermined signal processings on the video signal, audio signal, supplementary image signal, and the like which are inputted. In this way, recording data, which matches the format (file structure) as described above in FIG. 3 and FIG. 4, is outputted to a data processor 36.

The information encoded in the encoder section 50 and the management information prepared in the encoder section 50 are supplied to the hard disk device 2001 via the data processor 36, and may be recorded onto the hard disk. The information recorded on the hard disk may be recorded on the optical disk 1001 via the data processor 36 and the disk drive 35. Moreover, the information encoded in the encoder section 50 and the management information prepared in the encoder section 50 may be recorded onto the optical disk 1001 via the data processor 36 and the disk drive 35.

Further, when the information recorded on the hard disk of the hard disk device 2001 is the same as the data format of the optical disk 1001, the information in the hard disk is not encoded, and is recorded as it is onto the optical disk.

Further, when the information recorded on the hard disk of the hard disk device 2001 is different from the data format of the optical disk 1001, the information read out from the hard disk is encoded in the encoder section 50, and is recorded onto the optical disk 1001.

Here, standard encoding processing contents for preparing the recording data onto the optical disk 1001 will be briefly described. When the encoding processing starts in the encoder section 50, the parameters necessary for encoding processing the video (main image) data and the audio data are set. By using the set parameters, the main image data is subjected to pre-encoding processing. In this way, the distribution of the amount of codes appropriate for the set average transfer rate (recording rate) is calculated. On the basis of the code amount distribution obtained by the pre-encoding processing, the encoding processing of the main image data is executed. At this time, the encoding processing of the audio data is executed at the same time. In the same way, the parameters necessary for encoding processing the supplementary image data are set, and supplementary image data encoding-processed is prepared.

The main image data, the audio data, and the supplementary image data which have been subjected to encoding processing are combined and converted into the structure of a video object set VOBS. The cell is set as the minimum logical unit of the main image data (video data), and cell information as described in FIG. 5 is prepared. Next, the structure of the cell which forms the program chain PGC, and the attribute information and the like of the main image, the supplementary image, and audio are set, and a VMG file including various information is prepared. The information obtained at the time of encoding the respective data are used for a portion of the attribute information.

The main image data, the audio data, and the supplementary image data which have been subjected to encoding processing are subdivided into packs (FIG. 3) of a constant size (2048 bytes). Note that time stamps such as a PTS (presentation time stamp) showing a playback time, or a DTS (decoding time stamp) showing a decoding time, or the like are appropriately described in the packs. As for the PTS of the supplementary image, a time arbitrarily delayed more than the PTS of the main image data or the audio data in the same time period of playback may be described.

Further, the RDI pack (which corresponds to a navigation pack) is disposed at the head of the video object unit VOBU such that playback in the order of the time codes of the respective data is possible, and the respective cells are arranged. In this way, the video object VOB to be composed of a plurality of cells is structured. The video object set VOBS is recorded in the movie video file as a program by collecting one or more video objects VOB.

Note that, when the DVD playback signal is digitally copied from a DVD video player, because the contents of the above-described cells, program chain, management table, time stamps, and the like are determined from the start, there is no need to prepare them again.

The components which record information on the optical disk 1001 and which play back information from the optical disk 1001 are the disk drive 35, the data processor 36, a temporary storage section 37, and an STC (system time counter or system time clock) 38.

The temporary storage section 37 buffers a fixed amount of data among the data (the data to be outputted from the encoder section 50) to be written on the optical disk 1001 via the data processor 36 and the disk drive 35. Further, the temporary storage section 37 buffers a fixed amount of data among the data (the data to be inputted to the decoder section 60) played back from the optical disk 1001 via the disk drive 35 and the data processor 36. The disk drive 35 has a rotary control system, a laser driving system, an optical system, and the like.

For example, when the temporary storage section 37 is composed of a semiconductor memory (DRAM) of 4 Mbytes, the temporary storage section 37 can buffer about 8 seconds of recording data or playback data at a recording rate of an average of 4 Mbps (bits per second).

Further, when the temporary storage section 37 is composed of an EEP (electrically erasable and programmable) ROM (=flash memory), the temporary storage section 37 can buffer about 30 seconds of recording data or playback data at a recording rate of an average of 4 Mbps.

Moreover, when the temporary storage section 37 is composed of a microminiature HDD (hard disk drive) of 100 Mbytes, the temporary storage section 37 can buffer 3 minutes or more of recording data or playback data at a recording rate of an average of 4 Mbps.

When the remaining capacity of the optical disk 1001 is used up in the midst of recording onto the optical disk 1001, during the time until a new disk is prepared, the picture may instead be temporarily recorded in the temporary storage section 37. Of course, the picture can temporarily be recorded in the hard disk device 2001.

When the disk drive 35 is a high speed drive (more than double speed), the data excessively read out can be temporarily stored in the temporary storage section 37. If the data read out from the optical disk 1001 are buffered at the temporary storage section 37, there is a countermeasure to vibration shock. Namely, if a reading error is temporarily caused due to an optical head (not shown) being shifted by vibration shock, due to the playback data buffered at the temporary storage section 37 being outputted, it is possible to not interrupt the playback image.

The data processor 36 supplies the DVD recording data outputted from the encoder section 50 to the disk drive 35 in accordance with the control of the microcomputer block 30. Further, the data processor 36 fetches the DVD playback signal played back from the optical disk 1001, from the disk drive 35 in accordance with the control of the microcomputer block 30. Moreover, the data processor 36 rewrites the management information recorded on the optical disk 1001, and deletes the data (file or video project) recorded on the optical disk 1001.

The microcomputer block 30 is equipped with an MPU (micro processing unit) or a CPU (central processing unit), and a ROM in which a control program and the like are written, and a RAM for providing a work area necessary for executing programs. In accordance with the control program stored in the ROM, the MPU of the microcomputer block 30 uses the RAM as a work area, and carries out defective place detection, unrecorded region detection, recording information recording position setting, UDF recording, AV address setting, and the like.

Further, the microcomputer block 30 has an information processing section necessary for controlling the whole system. For example, the microcomputer block 30 is equipped with a copy information detecting/setting section, a directory detecting section, a VMG management information preparing section, and a remaining capacity amount detecting section. The copy information detecting/setting section detects copy information which shows, for the target video/audio signal to be recorded, that copying is prohibited, or duplicate copying is prohibited, or there are no restrictions on copying, or the like. The remaining capacity detecting section detects the remaining capacity of the recording destination (optical disk 1001 or HDD 2001).

Among the results of the processings carried out at the microcomputer block 30, the contents to be notified to a user are displayed at a display section 48 of the DVD video recorder. Or, the contents are OSD (on screen display) displayed on a monitor display.

Note that the timings at which the disk drive 35, the data processor 36, the encoder section 50, and the decoder section 60 are controlled by the microcomputer block 30 are based on the time data from the STC 38. The operations of recording and playback are usually executed synchronously with the time clock from the STC 38. The processings other than the operations of recording and playback may be executed at timings independent from the STC 38.

The decoder section 60 is equipped with a separator 62, a memory 63, a decoder group 64, and a video processor 66. The separator 62 separates and removes respective packs from image information having the pack structure as shown in FIG. 3. The memory 63 is used in separating the packs and at the time of executing other signal processings. The decoder group 64 is equipped with a V decoder, an SP decoder, and an A decoder. The V decoder decodes the main image data (the contents of the video pack) separated by the separator 62. The SP decoder decodes the supplementary image data (the contents of the supplementary image pack) separated by the separator 62. The A decoder decodes the audio data (the contents of the audio pack) separated by the separator 62. The video processor 66 appropriately synthesizes supplementary image data to be obtained from the SP decoder with the main image data to be obtained from the V decoder, and superposes a menu, a highlight button, subtitles, and other supplementary images on the main image, and outputs the image.

The output of the video processor 66 is inputted to a video mixer 71. The video mixer 71 synthesizes text data. Further, the line which directly takes in the signal from the TV tuner 44 and the A/V input section 42 is also connected to the video mixer 71. A frame memory 72 used as a buffer is connected to the video mixer 71. When the output of the video mixer 71 is digital, the output is outputted to the exterior via an interface (I/F) 73, and when the output of the video mixer 71 is analog, the output is outputted to the exterior via a DAC 74.

When the output of the A decoder is digital, the output is outputted to the exterior via an interface (I/F) 75. When the output of the A decoder is analog, the output is, analog-converted at a DAV 77 to be outputted to the exterior via a selector 76. When the selector 76 directly monitors signals from the TV tuner 44 and the A/V input section 42, the selector 76 can select the output from the ADC 52 by the select signal from the microcomputer block 30. The analog audio signals are supplied to an external component (a multichannel stereo device having 2 channels to 6 channels) (not shown).

A brief description of a flow of the video signals at the recording/playback device shown in FIG. 1 is as follows.

First, the inputted AV signal is digitally converted at the ADC 52. The video signals are inputted to the V encoder, the audio signals are inputted to the A encoder, and character data such as character broadcasting and the like is inputted to the SP encoder. The video signals are MPEG compressed, and the audio signals are AC3 compressed or MPEG audio compressed, and the character data is run-length-compressed.

The packed compressed data from the respective encoders are made into packets so as to be 2048 bytes, and are inputted to the formatter 56. The formatter 56 packs the respective packets, and multiplexes them, and transmits them to the data processor 36.

Further, the formatter 56 prepares an RDI pack on the basis of the aspect information, and places the RDI pack at the head of the video object unit (VOBU). The data processor 36 attaches error correction data to 16 packs, and forms ECC (Error Correction Code) block data. The ECC block data is recorded onto the optical disk 1001 via the disk drive 35. However, when the disk drive 35 is in a busy state such as it is currently seeking or is track jumping or the like, during the period of time until the busy state is dissolved, the ECC block data is stored at the temporary storage section 37.

Further, the formatter 56 prepares respective bracketing information during recording, and transmits the bracketing information to the MPU of the microcomputer block 30 periodically (information at the time of interrupting the head of GOP or the like). The bracketing information is information such as a number of packs of the VOBU, an end address of an I picture from the head of the VOBU, a playback time of the VOBU, and the like.

The aspect information is transmitted to the MPU at the time of starting recording, and the MPU prepares VOB stream information (STI). The VOB stream information includes resolution data, aspect data, and the like. At the time of playback, respective decoder sections carry out various initial settings on the basis of the VOB stream information.

Further, in the DVD for recording/playback, the video file is one file per one disk. A real time recording/playback device which processes a DVD for recording/playback must continue playing back uninterruptedly, even at the time of accessing (seeking) data. Therefore, the minimum continuous unit called CDA (continuous data area) is determined.

The CDA is advantageously a unit of ECC block data. Therefore, the size of the CDA is a multiple of 16 sectors. In the file system, recording is carried out in CDA units. However, when there are no empty regions of the CDA size in the disk, a short sector used by another file is permitted to enter in to the CDA. In this way, recording can be carried out in CDA units.

Figure 6:
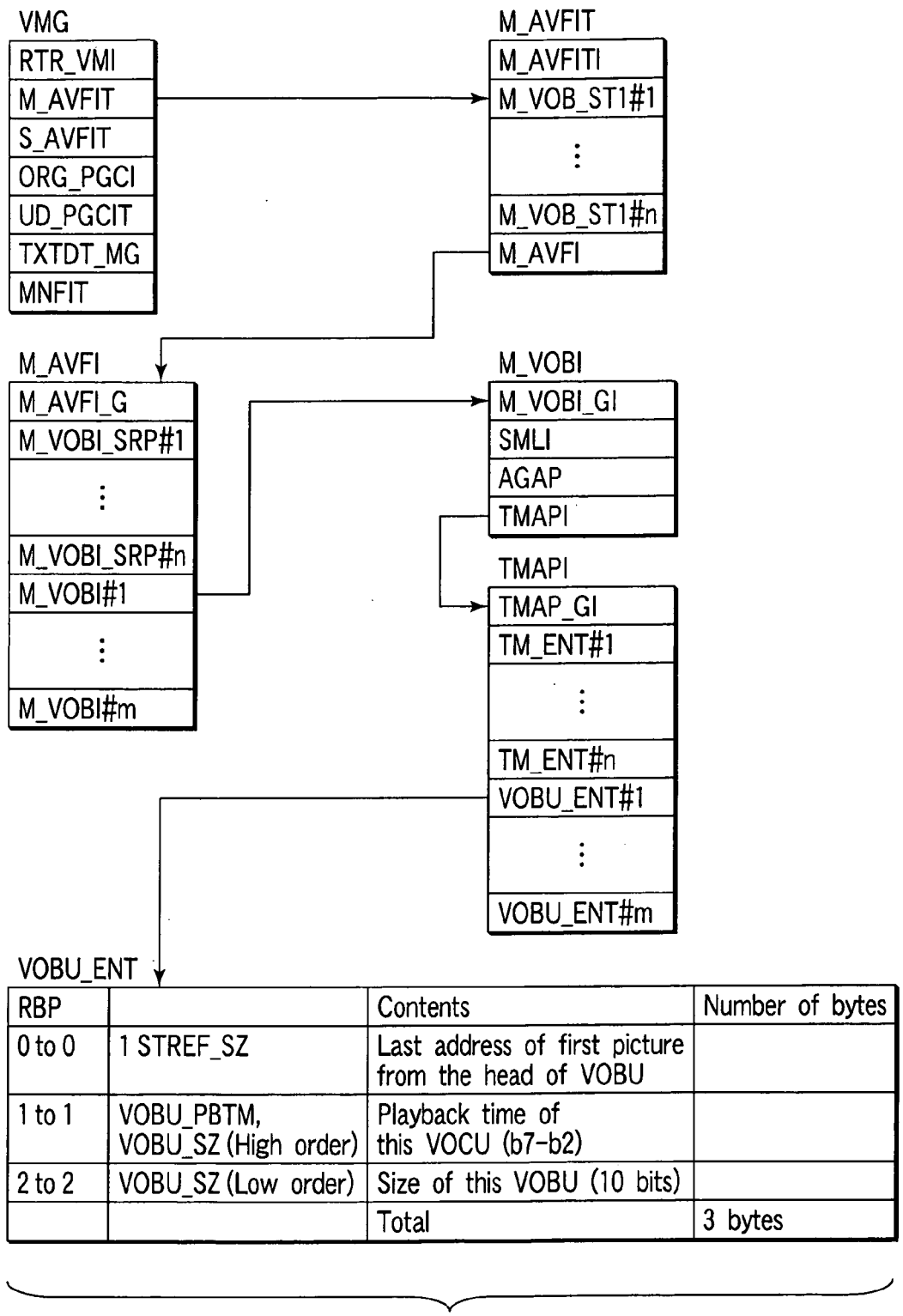
FIG. 6 is a figure hierarchically showing a movie AV file information table (M_AVFIT) in the video manager (VMG).

FIG. 6 is a figure hierarchically showing a movie AV file information table (M_AVFIT) in the video manager (VMG). The M_AVFIT includes stream information (M_VOB_STI). The M_VOB_STI includes a number of the recorded VOBs (programs), stream numbers of the audio or the supplementary images corresponding to the respective VOBs, and attributes of the respective VOBs (television system, aspect ratio, and the like). Moreover, M_AVFI includes general information, individual information, and time map information (TMAPI) of the VOBU in the VOB. The time map information is used at the time of special playback. The general information is information showing that the VOB can be played back or has been temporarily erased, and is information regarding the date and time when the VOB was recorded (recording time). The individual information is system clock information serving as information (SMLI) for continuously playing back the search pointers of the respective VOBs and a plurality of VOBs.

A recording function which handles a plurality of recording surfaces is provided in the system of the present invention. In accordance with this function, while recording the target data onto a predetermined surface (for example, the front surface) of a DVD-RAM, when a remaining recording capacity of this recording surface is less than a predetermined value, the target data can be recorded onto the both surfaces of the DVD-RAM or onto a plurality of DVD-RAMs without causing omissions in recording in the midst of the target data. Moreover, if there is no restriction of duplicate copy prohibition in the target data, the target data can be recorded so as to be partly duplicated. Hereinafter, this operation will be described.

As shown in FIG. 1, a copy information detecting/setting section is provided at the microcomputer block 30 of the recording/playback device. The copy information detecting/setting section detects, for example, (1) from a signal which has been multiplexed on the horizontal blanking of a broadcast signal, that copying of the contents included in the broadcast signal is permitted without any restrictions (there is no restriction of duplicate copying prohibition), or is permitted only one time (there is the restriction of duplicate copying prohibition). Or, the copy information detecting/setting section detects (2) whether or not the video signal itself included in the broadcast signal is scrambled. If the video signal is scrambled, copying is prohibited. Further, both of the above-described systems (1) and (2) may be adopted. The copy information detecting/setting section stores copying prohibition information on the basis of the above-described results of detecting.

When the optical disk 1001 is loaded in the recording-playback device, a loading of the disk is detected by the disk sensor, and a disk detection signal is supplied from the disk sensor to the microcomputer block 30. When an initialized optical disk 1001 is loaded in, around several tens of seconds are required until preparation for recording onto the optical disk 1001 is completed. The breakdown thereof is the time until a rotational speed of the optical disk 1001 reaches a desired speed, the time of reading management information from the optical disk 1001 which has reached the desired rotational speed, and the time of storing the read management information in the temporary storage section 37. When an un-initialized optical disk 1001 is loaded in, in addition to the time until the completion of the above-described preparations for recording, time (several minutes) for initializing the optical disk 1001 is required.

If recording onto the optical disk 1001 is instructed (recording instruction for disk) in a state in which the preparations for recording onto the optical disk 1001 have not yet been completed, the target video/audio data is recorded onto the hard disk drive (HDD) 2001 instead of the optical disk 1001, by recording control of the microcomputer block 30. Accompanying the completion of the preparations for recording onto the optical disk 1001, the target video/audio data recorded on the HDD 2001 is recorded onto the optical disk 1001.

Figure 7:
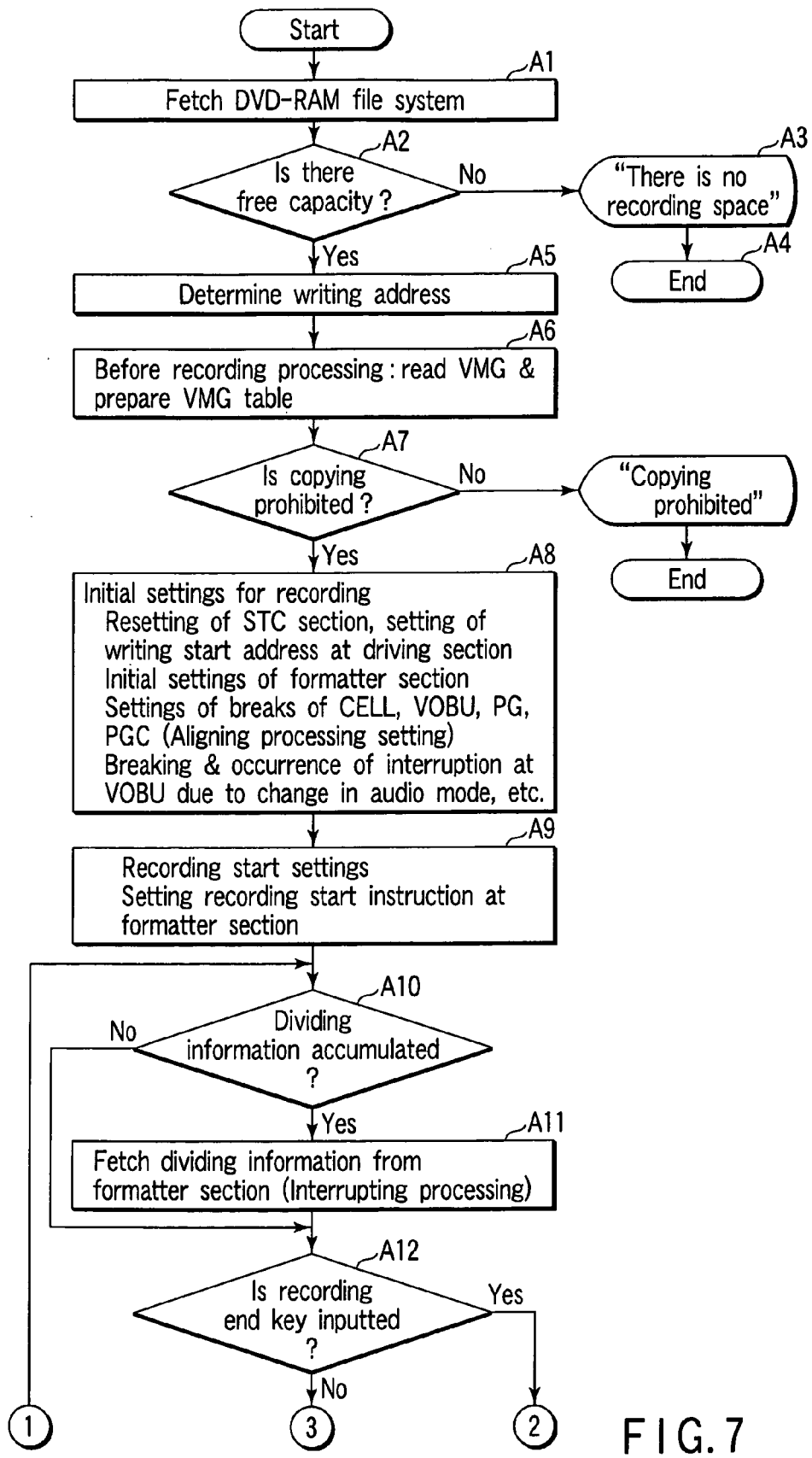
FIG. 7 is a flowchart showing a first part of a recording processing onto a DVD-RAM and an HDD.

FIG. 7 is flowchart showing recording processing onto a DVD-RAM and an HDD.

If an initialized optical disk 1001 is loaded in the recording-playback device, the loading of the disk is detected by the disk sensor, and the file system of the optical disk 1001 is fetched (step A1). Here, it is judged whether or not there is free space in the optical disk. When there is no free space (step A2, NO), for example, "There is no recording space." is warningly displayed (step A3). When there is free space (step A2, YES), a writing address is determined (step A5), the file system is read, the VGM is read (or prepared), and the VMG table is prepared (step A6).

Next, it is judged whether an input signal (broadcasting signal or reading signal from another medium) is copy-prohibited or not (step A7). If copying is prohibited (step A7, NO), the message that the contents are copy-prohibited is displayed on a display (the display section 48 and/or a TV display) by control of the computer block 30.

In a case of the copy permission (or once-copy permission) (step A7, YES), when a state in which recording is possible is confirmed by the microcomputer block 30, recording initial settings are carried out in the encoder section 50 (step A8). Namely, as the resetting of an STC section, the setting of the writing start address to the drive section, the setting of the writing instruction, the initial setting for the formatter section, and the setting of aligning processing, the settings of the breaks of the cell, the VOBU, the program (PG), and the program chain (PGC) are carried out.

Moreover, at the time of starting recording, a recording start instruction is set in the formatter section (step A9). The dividing information from the formatter section is registered as the VOBU. When recording starts, frames of the input video signals are compressed in GOP units at the encoder section 50, these GOPs are packed, and the packs are collected and gathered in VOBU units. Aspect ratio information is inserted into the sequence header of the GOP (refer to FIG. 3 of (B)). Further, an RDI pack (refer to FIG. 3 of (B), FIG. 4) is placed as the head pack of the VOBU. At this time, as described in FIG. 3 of (A), audio packs, supplementary image packs, and the like are also collected together.

When the dividing information have accumulated in the formatter section 56 (step A10, YES), interrupting processing for fetching the dividing information from the formatter 56 is carried out (step A11). The dividing information are temporarily fetched into the work RAM as VOBU management information. Further, checking as to whether a recording end key has been inputted or not, or whether a recording end command (a command in the case of the end of the reservation recording) has been inputted or not, are carried out (step A12). Moreover, a processing for calculating the remaining capacity (step A13) and a processing for judging whether the remaining capacity is in less than a given value or not are carried out (step A14). When the remaining capacity is less than a given value (step A14, YES), a remaining capacity shortage processing is carried out (step A15). In accordance with this remaining capacity shortage processing, replacement of recording surfaces (replacing or turning-over the disk) is required. The details of the remaining capacity shortage processing will be described later with reference to FIG. 10.

When 1 CDA of encoded recording data is accumulated in the buffer memory (step A16, YES), 1 CDA of data is recorded onto the optical disk 1001 (step A17). In correspondence with this recording operation, the recordable capacity is checked. When there is recordable capacity (step A18, NO), the routine returns to step A10. When there is no recordable capacity (step A18, YES), the dividing information is fetched into the microcomputer block from the formatter section, and initialization is carried out (step A19).

Next, it is judged whether there is or is not data temporarily recorded in the hard disk or in the buffer RAM instead of the hard disk (step A20). When there is such data (step A20, YES), the data of the hard disk or the buffer RAM is recorded onto the optical disk 1001, and the data of the hard disk or the buffer RAM is cleared (step A21).

Next, recording end processing is carried out (step A22). By the recording end processing, the file system is updated, and the updated management information (PGCI settings, dividing information, and the like) is written to the video manager (VMG). In the aforementioned updating of the file system, when data is transfer-recorded from the hard disk to the optical disk 1001, link information is prepared such that this data is placed at the head on the optical disk 1001.

Figure 9:
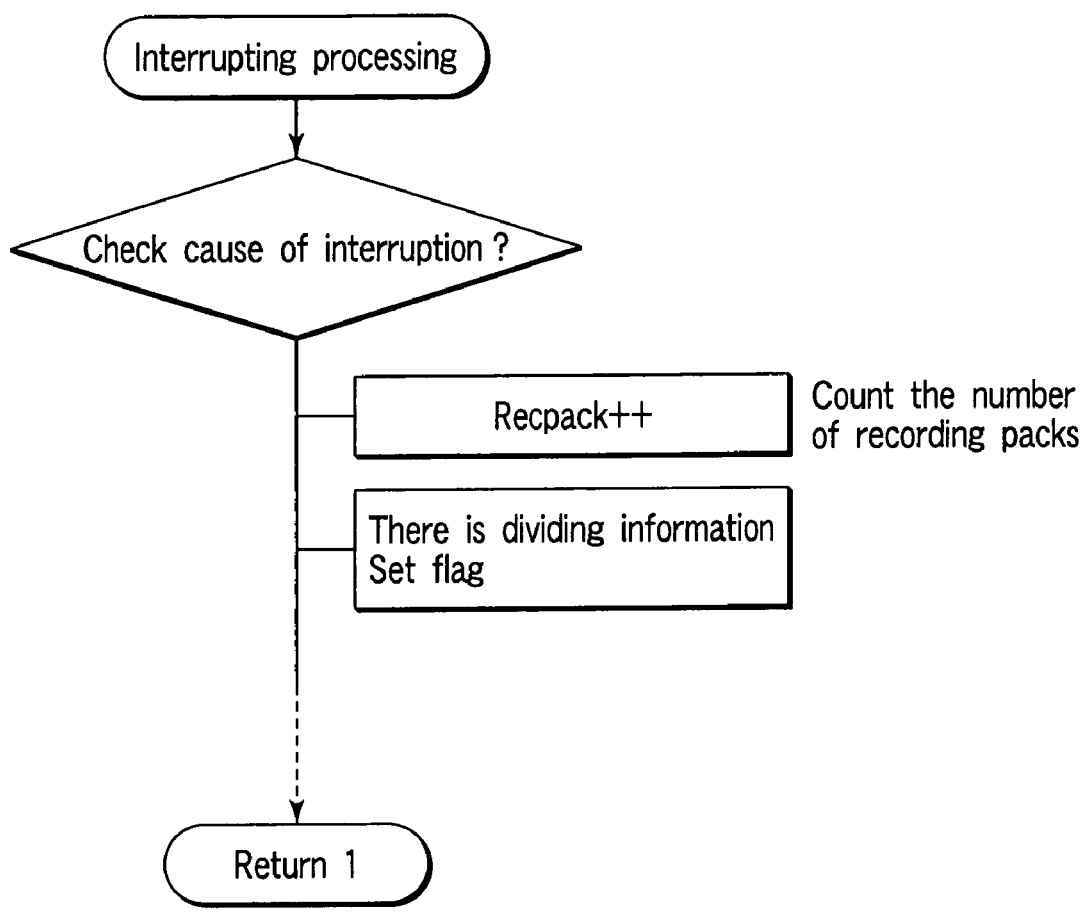
FIG. 9 is a figure showing an interrupting processing for a DVD-RAM.

Next, the interrupting processing shown in step A11 of FIG. 7 will be described with reference to the flowchart shown in FIG. 9.

When interrupting information is detected, the cause of interrupting is checked, and data of 1 pack is transferred to the data processor 36, and the number of recording packs are counted. Further, for the packs which are successively processed in the formatter 56, an interrupting flag is set at each time one dividing information is fetched. This processing is continued until the interrupting is cancelled. When the interrupting is cancelled, it is judged from the number of packs through steps A11, A12, A13, AND A14 whether or not there is 1 CDA of data. Further, the interrupting flag is erased. In this way, if interrupting processing is carried out, the dividing information for preparing a cell, a VOBU, a PG, a PGC, and the like is not lost.

Figure 8:
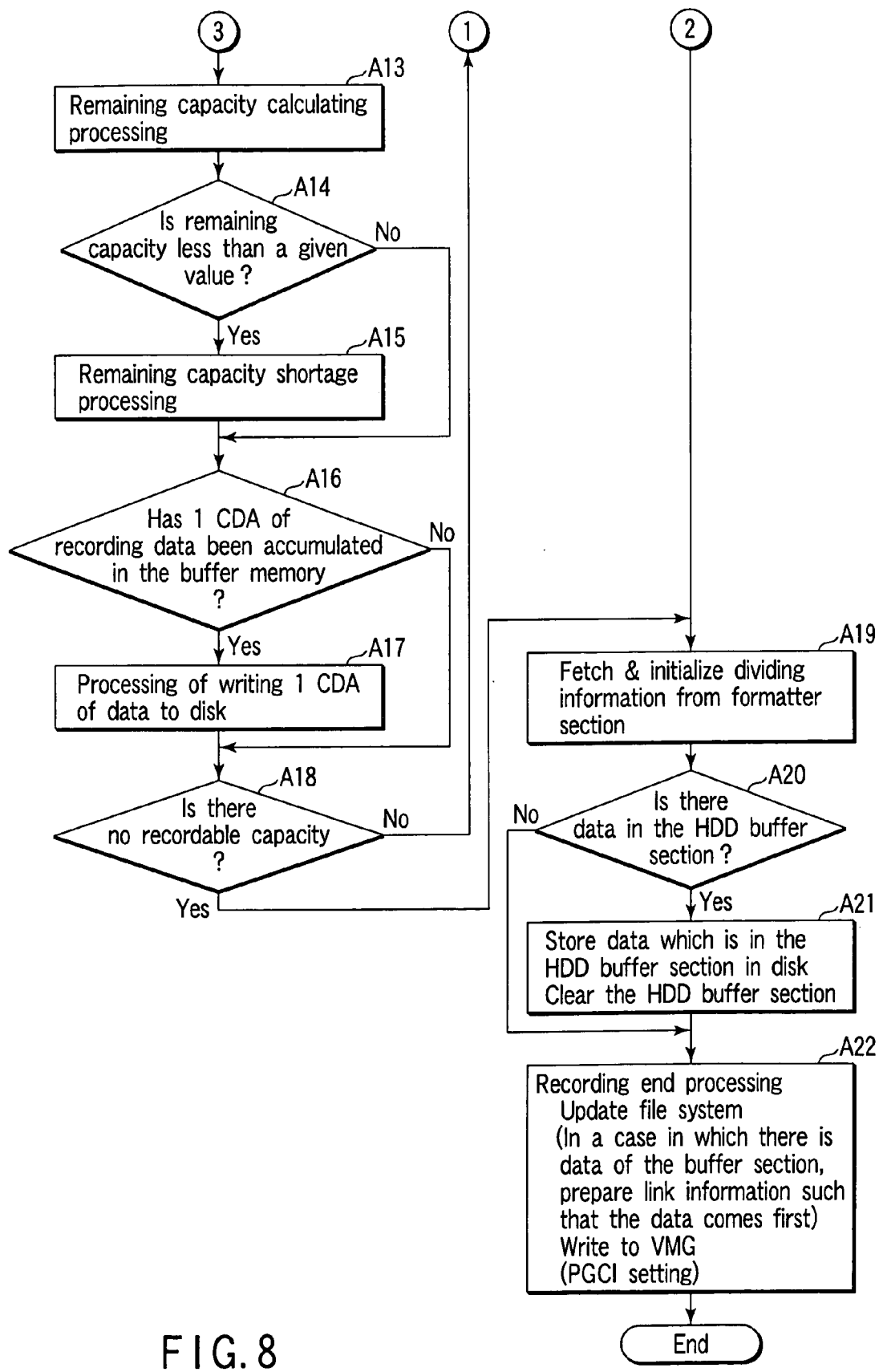
FIG. 8 is a flowchart showing a second part of the recording processing onto a DVD-RAM and an HDD.
Figure 10:
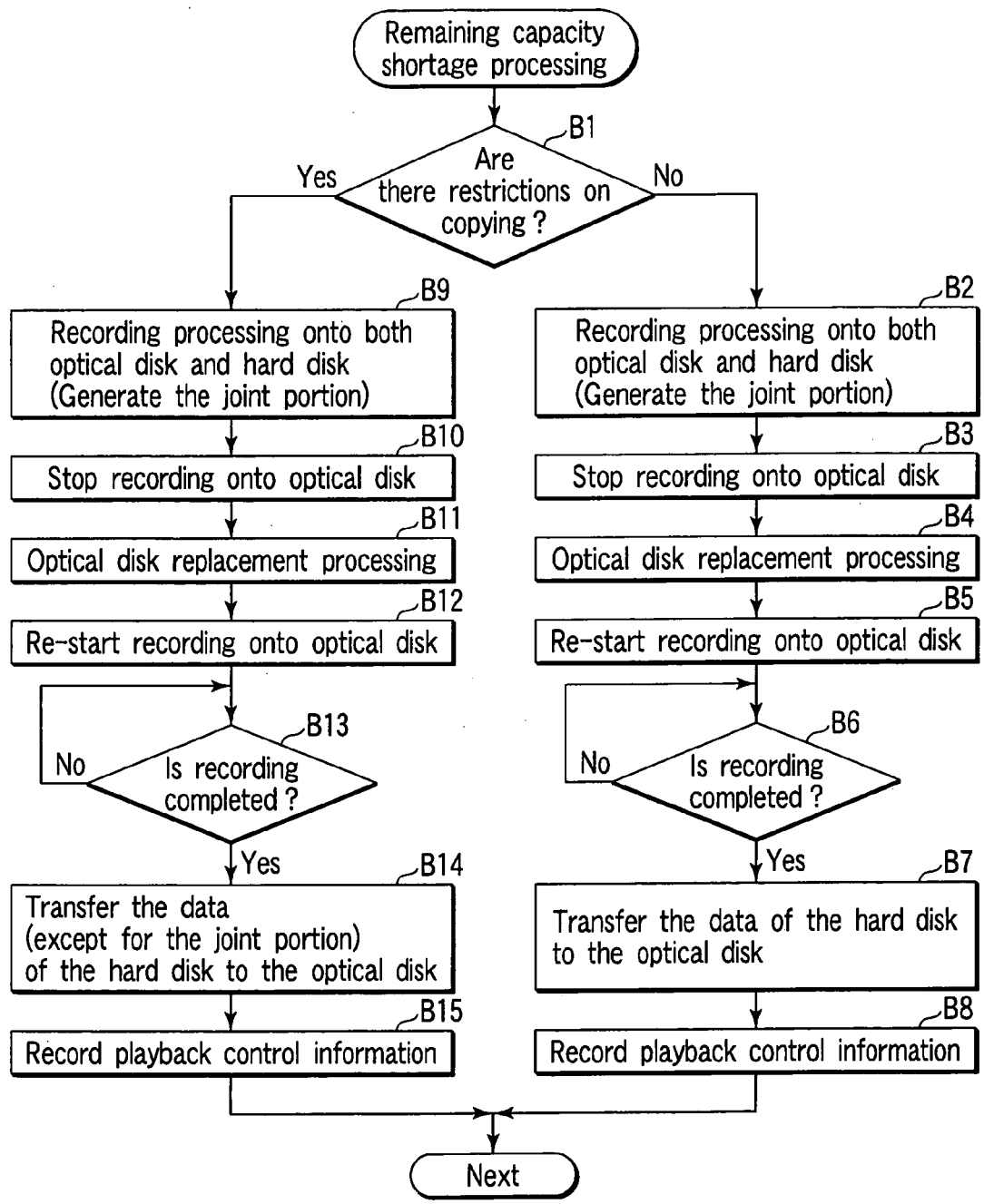
FIG. 10 is a flowchart showing processing at a time when a remaining recording capacity of a DVD-RAM is less than a predetermined value.

FIG. 10 is a flowchart showing the remaining capacity shortage processing of step A15 of FIG. 8. When the remaining capacity of the optical disk 1001 is less than or equal to a given value, copy restrictions of the data currently being recorded are checked by the copy information detecting/setting section of the microcomputer block 30 (step B1).

When there are no copy restrictions (step B1, NO), namely, in a case where copying is permitted without any restrictions, recording onto the optical disk 1001 is continued, and the same data is also recorded in the hard disk (step B2). At this time, each of the same data which are recorded onto both of the optical disk 1001 and the hard disk will become a joint portion (duplicated recording portion) later.

When the recording of the joint portion proceeds to a certain extent, while the recording onto the hard disk (the data recorded here is called recorded data 1) continues as is, the recording onto the optical disk 1001 is stopped (end of recording of joint portion) (step B3), and disk replacement processing is executed (step B4). The disk replacement processing is replacement processing (the replacement or the turning over of the disk) carried out by the user or the disk changer section 300. For example, supposing that the replacement processing is carried out by the user, a message which requests that the user replace or turn over the disk is outputted through the display. When the replacement or the turning over the disk is carried out by the user in correspondence with this message, recording (the data recorded here is called recorded data 2) is resumed onto the newly provided recording surface (step B5). In accordance with this, the recording onto the hard disk (the recording of recorded data 1) is completed. When the recording onto the newly provided recording surface (the recording of recorded data 2) is completed (step B6, YES), the joint portion and recorded data 2 which are recorded on the hard disk are recorded (the data recorded here is called recorded data 3) onto the newly provided recording surface (step B7). Moreover, playback control information, which plays back in the order of the joint portion, the recorded data 1, and the recorded data 2, is recorded onto the newly provided recording surface (step B8). This playback control information is included in the VMG.

When there are copy restrictions (step B1, YES), namely, in a case where copying only one time is permitted, the recording onto the optical disk 1001 continues, and the same data is also recorded onto the hard disk (step B9). At this time, each of the same data which are recorded onto both of the optical disk 1001 and the hard disk becomes a joint portion (duplicated recorded portion). When the recording of the joint portion proceeds to a certain extent, while the recording onto the hard disk (the data recorded here is called recorded data 1) continues as is, the recording onto the optical disk 1001 is stopped (end of recording of joint portion) (step B10), and disk replacement processing is executed (step B11). When the replacement or the turning over of the disk is carried out, recording (the data recorded here is called recorded data 2) is resumed onto the newly provided recording surface (step B12). In accordance with this, recording onto the hard disk (the recording of recorded data 1) is completed. When the recording onto the newly provided recording surface (the recording of recorded data 2) is completed (step B13, YES), the recorded data 1 recorded on the hard disk is recorded (the data recorded here is called recorded data 3) onto the newly provided recording surface (step B14). Namely, the joint portion recorded on the hard disk is not recorded onto the newly provided recording surface. Moreover, playback control information, which plays back in the order of the recorded data 1 and the recorded data 2, is recorded onto the newly provided recording surface (step B15). This playback control information is included in the VMG.

Figure 11:
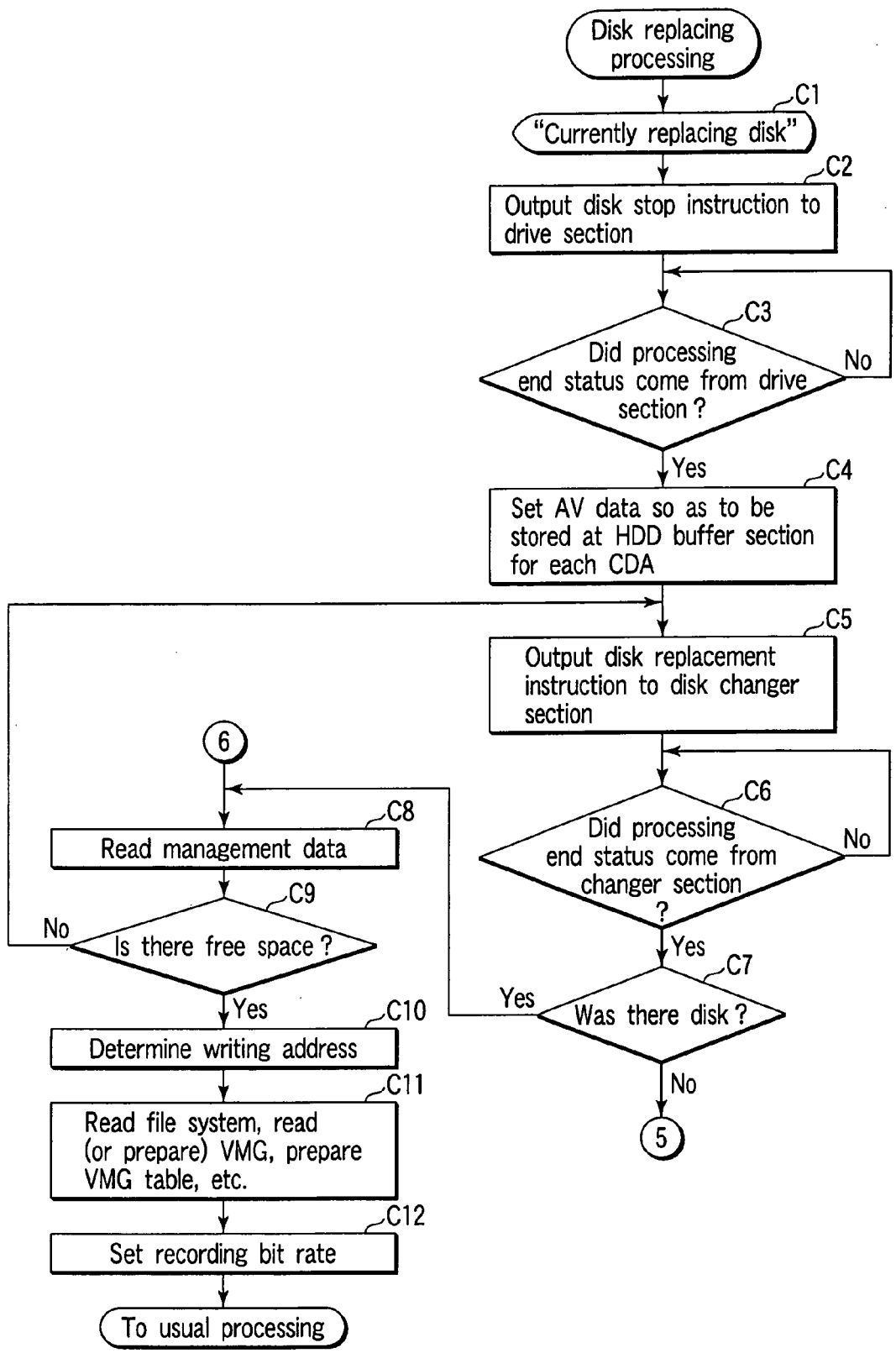
FIG. 11 is a flowchart showing a first part of a disk replacement processing by a disk changer.
Figure 12:
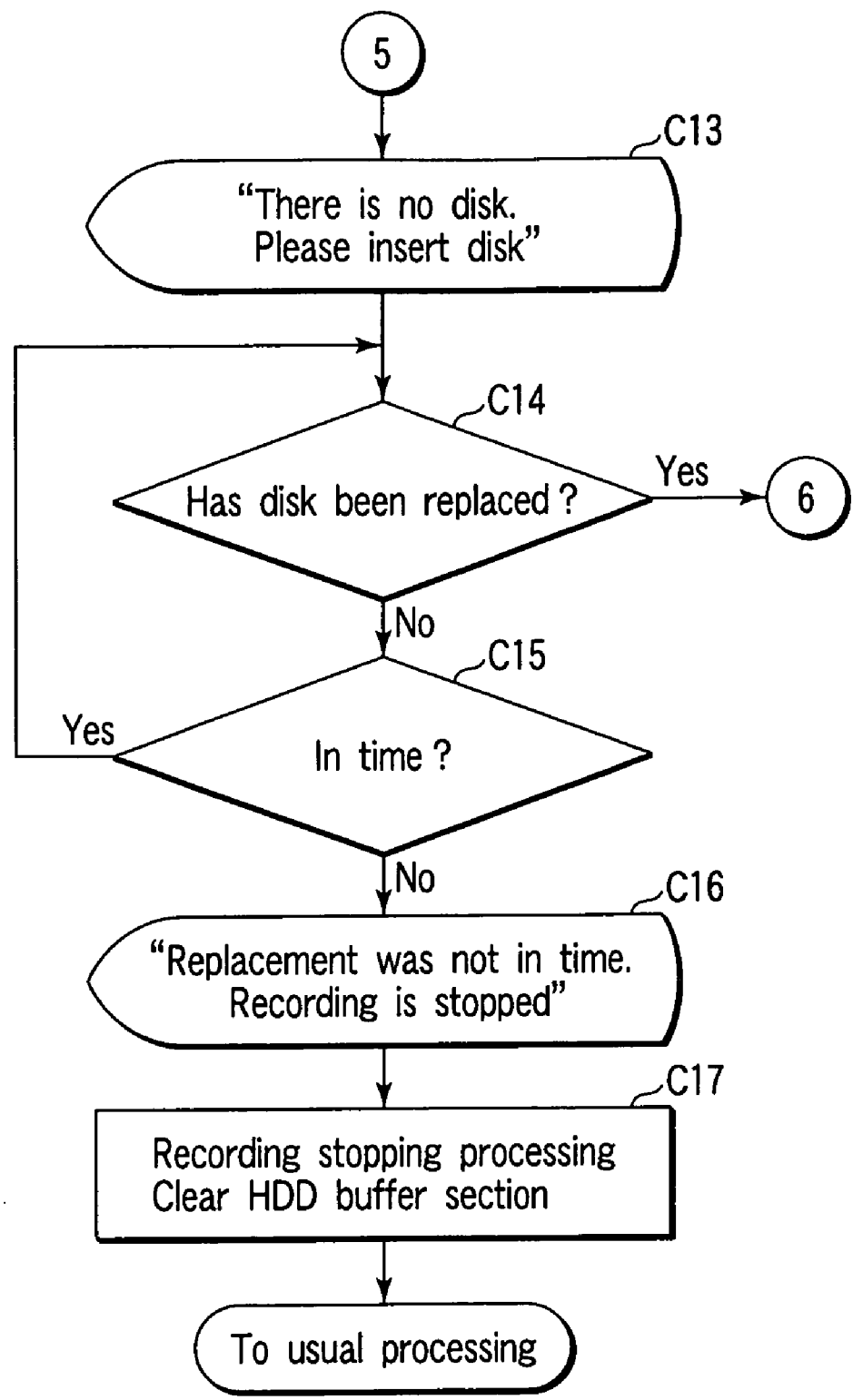
FIG. 12 is a flowchart showing a first part of a disk replacement processing by a disk changer.

FIG. 11 is a flowchart showing the disk replacement processing of FIG. 10. Here, the disk replacement processing carried out by the disk changer section 300 will be described.

The microcomputer block 30 controls the disk changer section 300 to execute the disk replacement processing. When the routine proceeds into the disk replacement processing, "currently replacing disk" is displayed on the screen (step C1), and the microcomputer block 30 outputs a disk stop instruction to the disk drive 35 (step C2). The disk drive 35 outputs a processing end status in response to the disk stop instruction. When the microcomputer block 30 receives the processing end status (step C3, YES), the microcomputer block 30 sets the AV data to be transferred to the hard disk drive device 2001 in CDA units (step C4).

Next, the microcomputer block 30 outputs a disk replace instruction to the disk changer section 300 (step C5). The disk changer section 300 which receives the disk replace instruction drives the tray on which the disk is loaded so as to be in a state in which disk replacement is possible. Namely, the tray is sent out to the exterior of the device. Here, the user turns the disk on the tray over or loads a new disk on the tray, and pushes the tray in toward the device. The pushed-in tray moves into the inner portion of the device, and at this time, the disk drive 35 outputs a processing end status in response to the disk replace instruction. When the microcomputer block 30 receives the processing end status (step C6, YES), the presence/absence of a disk on the tray is checked.

If a disk exists on the tray (step C7, YES), the management data is read out from the disk on the tray (step C8), and the free capacity is checked. If there is no free capacity (step C9, NO), the microcomputer block 30 outputs a disk replace instruction to the disk changer section 300 again (step C5). If there is free capacity (step C9, YES), the address of the writing destination is determined (step C10), the file system is read, the VMG is read (or prepared), the VMG table is prepared (step C11), and the recording bit rate is set (step C12). When the routine moves into the disk replacement processing in the midst of recording, the recording bit rate set after the completion of the disk replacement processing may be the same as the recording bit rate before the disk replacement processing. Further, the recording bit rate may be newly recalculated from the remaining recording time and the remaining capacity of the disk.

If there is no disk on the tray (step C7, NO), "There is no disk. Please insert a disk." is displayed on the screen (step C13). When the disk is replaced (step C14, YES) or the disk is turned over (step C14, YES), the processing moves on to step C8. If the disk has not been replaced for a predetermined period of time (step C15, NO), "Replacement was not in time. Recording has been stopped." is displayed on the screen (step C16). Moreover, recording stopping processing is carried out, and the portion which was recorded on the hard disk (e.g., the duplicate recorded portion) is cleared (step C17), and the operation moves to the usual processing.

Further, the recording-playback device of the present invention may be provided with a function which, when the recording regions of the hard disk are used up, displays that on a screen, and clears the joint portion recorded on the hard disk, and ends the recording processing.

FIG. 13 is a figure showing examples of messages which are displayed on the screen at the time of replacing the disks. Information such as the disk is currently being replaced, replacement of the disk has been completed, there has been an error in the replacing of the disk, and the like is displayed.

Hereinafter, the recording functions which handle a plurality of recording surfaces will be summarized.

In correspondence with an instruction to record information onto the optical disk 1001, the target information is recorded onto the first recording surface (for example, the front surface) of the optical disk 1001 by the first recording control of the microcomputer block 30. When, accompanying the first recording control, the remaining recording capacity of the first recording surface is less than a predetermined capacity, the target information continues to be recorded onto the first recording surface of the optical disk 1001 and the same target information is also recorded onto the HDD 2001 by the second recording control of the microcomputer block 30. Note that the remaining recording capacity is checked by a remaining capacity detecting section provided in the microcomputer block 30. Moreover, when, accompanying the first recording control, the remaining recording capacity of the first recording surface is less than the predetermined capacity, turning over of the optical disk 1001 or replacement of the disk is requested.

In correspondence with this request, when the second recording surface (for example, the reverse surface) of the optical disk 1001 or a predetermined recording surface of another optical disk 1001 is provided, the second recording control is stopped. Moreover, by the third (or the fourth) recording control of the microcomputer block 30, the following target information is recorded onto the second recording surface of the optical disk 1001 or the predetermined recording surface of the other optical disk 1001. Further, when there is no restriction of duplicate copy prohibition of the target information, the target information partly recorded on the HDD 2001 is also recorded so as to be partly duplicated with the target information recorded on the first recording surface of the optical disk 1001. When there is the restriction of duplicate copy prohibition of the target information, among the target information partly recorded on the HDD 2001, only the information of the part which is not duplicately recorded on the first recording surface of the optical disk 1001 is recorded.

Further, a link, which shows the link between the following target information, which is recorded on the second recording surface of the optical disk 1001 or the other optical disk 1001 by the third (or the fourth) recording control, and the target information transcribed from the HDD 2001, is set. Namely, a file system, which makes the target information transcribed from the HDD 2001 be played back before the following target information, is constructed. Or, program chain information (PGCI), which makes the target information transcribed from the HDD 2001 be played back before the following target information, is recorded. Note that the target information described above is recorded in CDA units.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording device which handles a plurality of recording surfaces comprising:
    first recording-playback means for carrying out recording of information onto a predetermined recording surface of a first information recording medium which is loadable and removable, and for carrying out playback of information recorded on the predetermined recording surface of the first information recording medium;
    a second information recording medium which is built-in;
    second recording-playback means for carrying out recording of information onto the second information recording medium, and for carrying out playback of information recorded on the second information recording medium;
    first recording control means for making target information be recorded onto the first recording surface of the first information recording medium by the first recording-playback means, in correspondence with an instruction to record information onto the first information recording medium;

second recording control means for, when, accompanying recording control of the first recording control means, a remaining capacity of the first recording surface is less than a predetermined capacity, making the target information continue to be recorded on the first recording surface of the first recording medium, and making the same target information be recorded onto the second information recording medium as well;

requesting means for requesting a second recording surface of the first information recording medium when, accompanying the recording control of the first recording control means, the remaining recording capacity of the first recording surface is less than the predetermined capacity; and third recording control means for, when the second recording surface of the first information recording medium is provided in correspondence with a request of the requesting means, stopping recording control by the second recording control means, and making following target information be recorded onto the second recording surface of the first information recording medium, and making the target information partially recorded on the second information recording medium be duplicately recorded with a part of the target information recorded on the first recording surface.

2. An information recording device which handles a plurality of recording surfaces according to claim 1, further comprising:

fourth recording control means for making link data be recorded onto the second recording surface of the first information recording medium, the link data showing a link between the following target information, recorded on the second recording surface by recording control of the third recording control means, and the target information transcribed from the second information recording medium.

3. An information recording device which handles a plurality of recording surfaces according to claim 2, wherein the fourth recording control means constructs, at the second recording surface of the first information recording medium, a file system which makes the target information transcribed from the second information recording medium be played back before the following target information.

4. An information recording device which handles a plurality of recording surfaces according to claim 2, wherein the fourth recording control means constructs, at the second recording surface of the first information recording medium, program chain information which makes the target information transcribed from the second information recording medium be played back before the following target information.

5. An information recording device which handles a plurality of recording surfaces according to claim 1, wherein the first and second recording-playback means record the target information in CDA units.

6. An information recording device which handles a plurality of recording surfaces comprising:

first recording-playback means for carrying out recording of information onto a predetermined recording surface of a first information recording medium which is loadable and removable, and for carrying out playback of information recorded on the predetermined recording surface of the first information recording medium;

a second information recording medium which is built-in;

second recording-playback means for carrying out recording of information onto the second information recording medium, and for carrying out playback of information recorded on the second information recording medium;

first recording control means for making target information be recorded onto the first recording surface of the first information recording medium by the first recording-playback means, in correspondence with an instruction to record information onto the first information recording medium;

second recording control means for, when, accompanying recording control of the first recording control means, a remaining capacity of the first recording surface is less than a predetermined capacity, making the target information continue to be recorded on the first recording surface of the first recording medium, and making the same target information be recorded onto the second information recording medium as well;

requesting means for requesting a second recording surface of the first information recording medium when, accompanying the recording control of the first recording control means, the remaining recording capacity of the first recording surface is less than the predetermined capacity;

third recording control means for, when the second recording surface of the first information recording medium is provided in correspondence with a request of the requesting means, stopping recording control by the second recording control means, and making following target information be recorded onto the second recording surface of the first information recording medium, and when there are no restrictions of duplicate copy prohibition in the target information, making the target information partially recorded on the second information recording medium be duplicately recorded with a part of the target information recorded on the first recording surface; and fourth recording control means for, when the second recording surface of the first information recording medium is provided in correspondence with a request of the requesting means, stopping the recording control by the second recording control means, and making the following target information be recorded onto the second recording surface of the first information recording medium, and when there is a restriction of duplicate copy prohibition in the target information, making, among the target information partially recorded on the second information recording medium, only the partial information, which is not duplicately recorded on the first recording surface, be recorded.

7. An information recording device which handles a plurality of recording surfaces according to claim 6, further comprising:

fifth recording control means for making link data be recorded onto the second recording surface, the link data showing a link between the following target information, recorded on the second recording surface of the first information recording medium by the recording control of the third or fourth recording control means, and the target information transcribed from the second information recording medium.

8. An information recording device which handles a plurality of recording surfaces according to claim 7, wherein the fifth recording control means constructs, at the second recording surface of the first information recording medium, a file system which makes the target information transcribed from the second information recording medium be played back before the following target information.

9. An information recording device which handles a plurality of recording surfaces according to claim 7, wherein the fifth recording control means constructs, at the second recording surface of the first information recording medium, program chain information which makes the target information transcribed from the second information recording medium be played back before the following target information.

10. An information recording device which handles a plurality of recording surfaces according to claim 6, wherein the first and second recording-playback means record the target information in CDA units.

11. An information recording device which handles a plurality of recording surfaces comprising:
   first recording-playback means for carrying out recording of information onto a first information recording medium which is loadable and removable, and for carrying out playback of information recorded on the first information recording medium;
   a second information recording medium which is built-in;
   second recording-playback means for carrying out recording of information onto the second information recording medium, and for carrying out playback of information recorded on the second information recording medium;
   first recording control means for making target information be recorded onto the first information recording medium by the first recording-playback means, in correspondence with an instruction to record information onto the first information recording medium;
   second recording control means for, when, accompanying recording control of the first recording control means, a remaining recording capacity of the first information recording medium is less than a predetermined value, making the target information continue to be recorded on the first recording medium, and making the same target information be recorded onto the second information recording medium as well;
   requesting means for requesting a replacement first information recording medium for the first information recording medium when, accompanying the recording control of the first recording control means, the remaining recording capacity of the first information recording medium is less than the predetermined capacity; and
   third recording control means for, when the replacement first information recording medium is provided in correspondence with a request of the requesting means, stopping recording control by the second recording control means, and making following target information be recorded onto the replacement first information recording medium, and making the target information partially recorded on the second information recording medium be duplicately recorded with a part of the target information recorded on the first information recording medium.

12. An information recording method which handles a plurality of recording surfaces, comprising:
   recording target information onto a first recording surface of a first information recording medium in correspondence with an instruction to record information onto the first information recording medium which is loadable and removable;
   making the target information continue to be recorded onto the first recording surface of the first information recording medium, and making the same target information be recorded onto a built-in second information recording medium when, accompanying recording of the target information onto the first recording surface of the first information recording medium, a remaining recording capacity of the first recording surface is less than a predetermined capacity;
   requesting a second recording surface of the first information recording medium when, accompanying the recording of the target information onto the first recording surface of the first information recording medium, the remaining recording capacity of the first recording surface is less than the predetermined capacity; and
   stopping recording onto the second information recording medium when the second recording surface of the first information recording medium is provided in correspondence with the request, and making following target information be recorded onto the second recording surface of the first information recording medium, and partially duplicately recording the target information partially recorded on the second information recording medium with the target information recorded on the first recording surface.

* * * * *